US009520766B2

(12) United States Patent
Barbati et al.

(10) Patent No.: US 9,520,766 B2
(45) Date of Patent: Dec. 13, 2016

(54) POWER SUPPLY DEVICE FOR A HOUSEHOLD APPLIANCE AND AN OPERATING METHOD THEREOF

(71) Applicant: Whirlpool Corporation, Benton Harbor, MI (US)

(72) Inventors: Mario Barbati, Cassinetta (IT); Carlo Calesella, Cassinetta (IT); Diego Naftali Gutierrez, Cassinetta (IT); Christiano Vito Pastore, Cassinetta (IT); Claudio Vittorio Crisafulli, Casinetta (IT)

(73) Assignee: Whirlpool Corportion, Benton Harbor, MI (US)

( * ) Notice: Subject to any disclaimer, the term of this patent is extended or adjusted under 35 U.S.C. 154(b) by 670 days.

(21) Appl. No.: 13/755,851

(22) Filed: Jan. 31, 2013

(65) Prior Publication Data

US 2013/0194839 A1   Aug. 1, 2013

(30) Foreign Application Priority Data

Jan. 31, 2012   (EP) .................................... 12153201

(51) Int. Cl.
*H02M 1/12* (2006.01)
*H02M 3/156* (2006.01)
*H05B 6/06* (2006.01)
*H05B 6/68* (2006.01)

(52) U.S. Cl.
CPC ............... *H02M 1/12* (2013.01); *H02M 3/156* (2013.01); *H05B 6/062* (2013.01); *H05B 6/68* (2013.01); *Y02B 40/143* (2013.01); *Y02B 70/1425* (2013.01)

(58) Field of Classification Search
CPC ...................................................... H02M 1/12
See application file for complete search history.

(56) References Cited

U.S. PATENT DOCUMENTS

| 4,595,814 | A | * | 6/1986 | Ogino et al. ................... 219/664 |
| 5,450,305 | A | * | 9/1995 | Boys et al. ....................... 363/24 |
| 6,043,633 | A |   | 3/2000 | Lev et al. |
| 6,114,842 | A | * | 9/2000 | Simpson et al. .............. 323/223 |
| 2005/0218830 | A1 | * | 10/2005 | Yadlapalli ...................... 315/224 |
| 2007/0035971 | A1 |   | 2/2007 | Yasumura |
| 2011/0316508 | A1 |   | 12/2011 | Cheng |

OTHER PUBLICATIONS

European Patent Application No. 12153201.4, filed Jan. 31, 2012, European Search re: Application No. 12153201, mail date Jan. 25, 2013.

* cited by examiner

*Primary Examiner* — Emily P Pham

(57) ABSTRACT

A household appliance power supply device and method are disclosed. The power supply device comprises a switching converter having an input filtering stage; and a determining means configured to obtain estimation data indicative of the input current that is adsorbed from the a main power input, on the base of the rate of change of the bus voltage across said bus capacitor respectively, during a second switching period. The switching converter further comprises a bus capacitor, electrically connected with at least one output terminal of a rectifying stage, a resonant tank, electrically connected with said bus capacitor, and a switching device electrically connected with said resonant tank, said switching device being operated with a switching cycle having a first switching period, and a second switching period.

20 Claims, 8 Drawing Sheets

POWER SUPPLY DEVICE FOR A HOUSEHOLD APPLIANCE AND AN OPERATING METHOD THEREOF

TECHNICAL FIELD

The present disclosure relates to a power supply device for supplying electric power to a household appliance.

In a further aspect, the present disclosure relates to a method for operating a power supply device for a household appliance.

BACKGROUND

As is known, a power supply device for a household appliance, such as a cook-top or a microwave oven, generally comprises an AC-AC switching converter, which provides a driving current having adjustable frequency and amplitude to feed a load, such as the induction coil of a cook-top or the primary winding of a step up transformer feeding a magnetron device.

Quasi-Resonant (Q-R) converters are widely used in power supply devices for household appliances, since they can adjust the switching frequency or duty-cycle to ensure that the switching converter is constantly switching in zero voltage/current conditions ("soft switching" operation) and are generally characterised by a relatively simple circuit structure.

In a power supply device for a household appliance, a controller is typically adopted for controlling the operation of the switching converter.

Such a controller operates in a continuous regime and performs a cycle-by-cycle regulation of the input current (or power) adsorbed by the power supply device.

Often, PWM modulation techniques are adopted to adjust a control quantity used for controlling the switching converter (e.g. the switching frequency or duty cycle), so that the input current follows a reference value (set-point).

Regardless of the kind of control loop that is adopted, a feedback signal, indicative of the input current that is actually adsorbed from the main power input by the power supply device, is generally required in order to calculate the current (or power) error between the current (or power) reference and the current (or power) that is actually adsorbed.

Traditionally, such a feedback signal is obtained by properly arranging a current sensor, e.g. a current transformer, a Hall Effect sensor, a shunt circuit or the like that is embedded within the power supply device.

The adoption of a dedicated current sensor entails an increase of the overall size of the power supply device and the need of arranging a relatively complex circuit structure.

Of course, these drawbacks determine an increase of the costs for manufacturing the power supply device at industrial level.

SUMMARY

Therefore, an aim of the present disclosure is to provide a power supply device for a household appliance, and an operating method thereof, which allows the overcoming of the drawbacks mentioned above.

Within this aim, it is an object of the present disclosure to provide a power supply device, and an operating method thereof, which allows avoiding the use of dedicated sensors for detecting the input current adsorbed by said power supply device.

A further object of the present disclosure is to provide a power supply device, and an operating method thereof, which can be easily implemented using relatively cheap circuitries and control techniques.

A further object of the present disclosure is to provide a power supply device, which is easy to manufacture at industrial level, at competitive costs.

Thus, the present disclosure provides a power supply device for a household appliance, according to the following claim 1.

In a further aspect, the present disclosure relates to a method for operating a power supply device for a household appliance, according to the following claim 9.

BRIEF DESCRIPTION OF THE DRAWINGS

Further features and advantages of the present disclosure will become apparent from the following description of disclosed embodiments, taken in conjunction with the drawings, in which.

DETAILED DESCRIPTION

Referring now to the cited figures, the present disclosure relates to a power supply device 100 for a household appliance, in this case an induction hob.

The power supply device 100 is electrically connectable to the main power input 10, from which it receives an input voltage $V_{IN}$ and an input current $I_{IN}$, which are periodic electric quantities having main power input semi-cycles of predefined duration. As an example, the duration of the main power input semi-cycle is fixed at 10 ms in 50 Hz electric power distribution networks.

The power supply device 100 comprises a switching converter that is electrically connected in parallel with the main power input 10.

Said switching converter is a Q-R switching converter.

The switching converter comprises a rectifying stage 12, for example a diode bridge, which is electrically connected with the main power input to receive the input voltage $V_{IN}$ and output a rectified voltage.

The switching converter comprises also an input filtering arrangement or stage that comprises a filtering inductor $L_D$, which is electrically connected in series with one of the main power input terminals.

A bus capacitor $C_{DC}$, which is electrically connected in parallel with the output terminals of said rectifying stage 12, is part of said filtering arrangement.

Said filtering stage comprises also a further filtering capacitor $C_D$, electrically connected in parallel with the main power input terminals.

The bus capacitor $C_{DC}$ is of a non-smoothing type, i.e. it has a relatively small capacitance value, so that the cut-off frequency of the filtering arrangement formed by the inductor $L_D$ and the capacitor $C_{DC}$ is quite higher than the main power input frequency.

Figure 5:
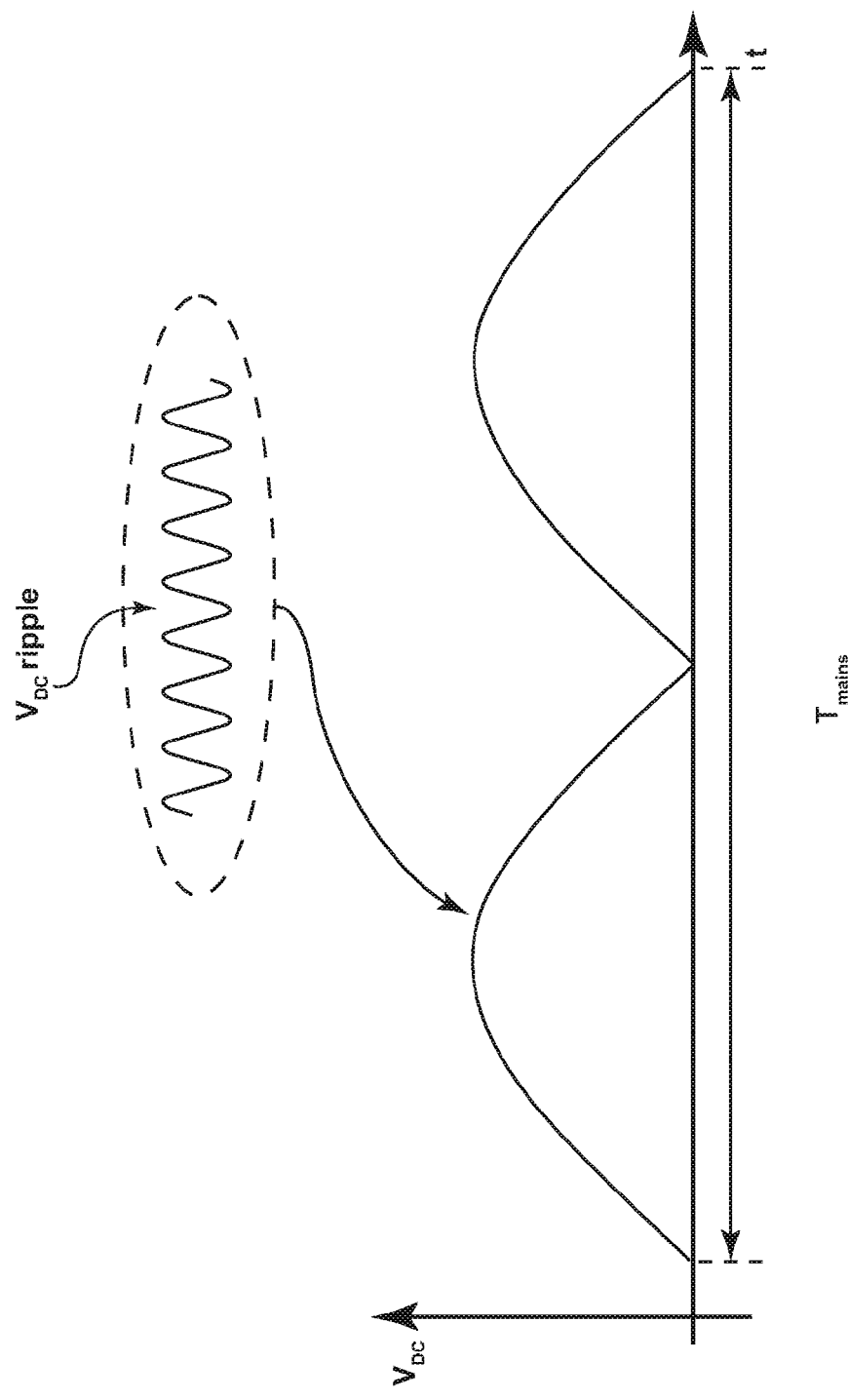
FIG. 5-6 are graphs illustrating the voltage waveform of the bus capacitor $C_{DC}$ during operating conditions related to the operation of the power supply device of FIG. 1.

The bus voltage $V_{DC}$ across the terminals A, B of the bus capacitor $C_{DC}$ thus substantially follows the behaviour of the rectified voltage provided by the rectifying stage 12, with fluctuations having a period equal to the half of a main power input cycle $T_{mains}$ (FIG. 5).

A terminal A of the bus capacitor $C_{DC}$ is electrically connected with a resonant tank 200, which may comprise an inductive-resistive load, schematically represented by a load inductance $L_{LOAD}$ and a load resistance $R_{LOAD}$.

Such an inductive-resistive load may be, for example, a pancake coil of an induction cook-top.

The resonant tank 200 may further comprise a resonant capacitor $C_{RES}$ that is generally electrically connected in parallel with said inductive-resistive load.

The switching converter comprises a switching device 130, for example an IGBT switch, which is advantageously connected in series with the resonant tank 200.

The switching device 130 has a switching cycle T that is quite shorter than the main power input cycle $T_{mains}$.

Basically, the switching cycle T is divided in two switching periods, each corresponding to a commutation state of the switching device 130.

Figure 1:
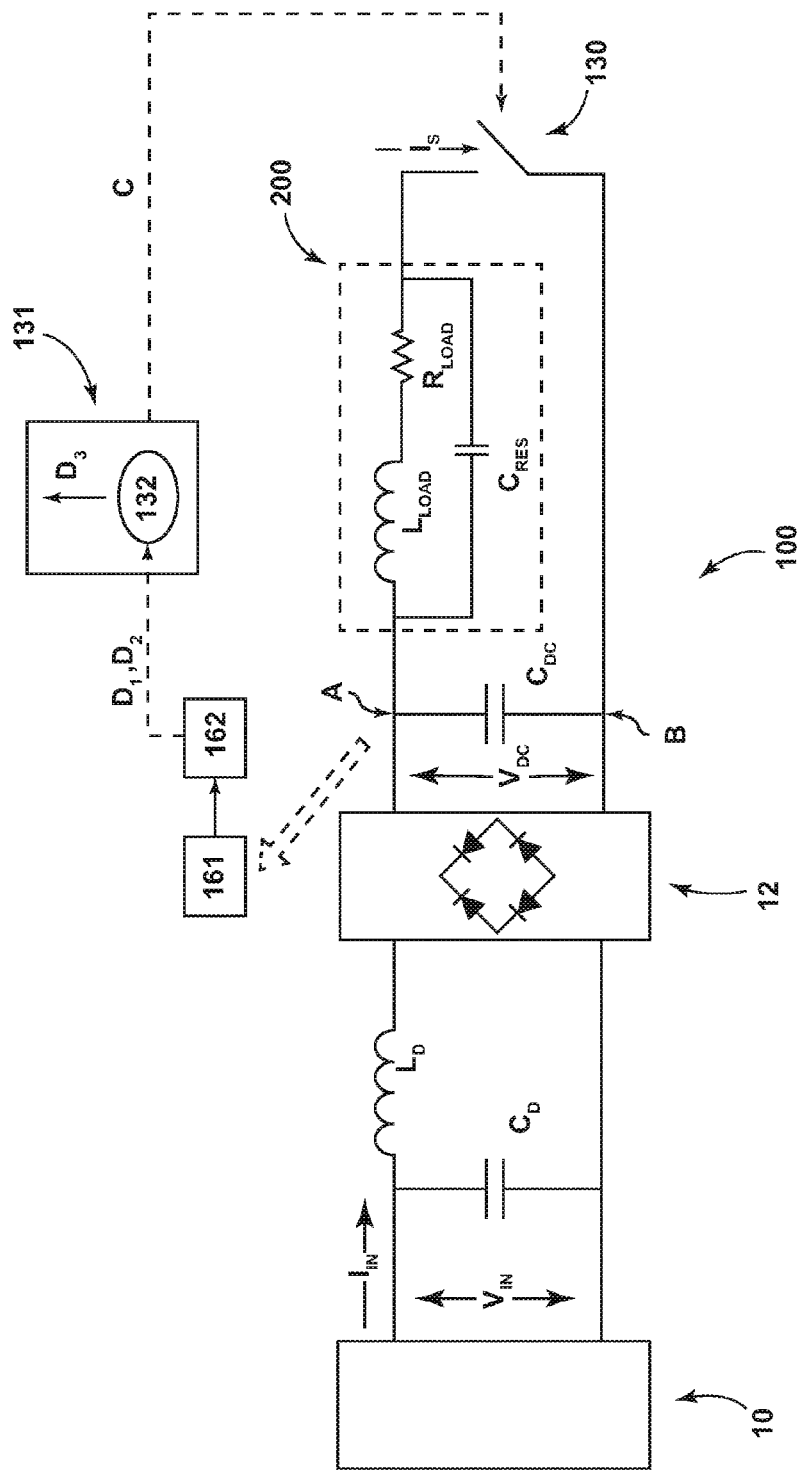
FIG. 1 shows a schematic diagram of an embodiment of the power supply device, according to the disclosure.
Figure 2:
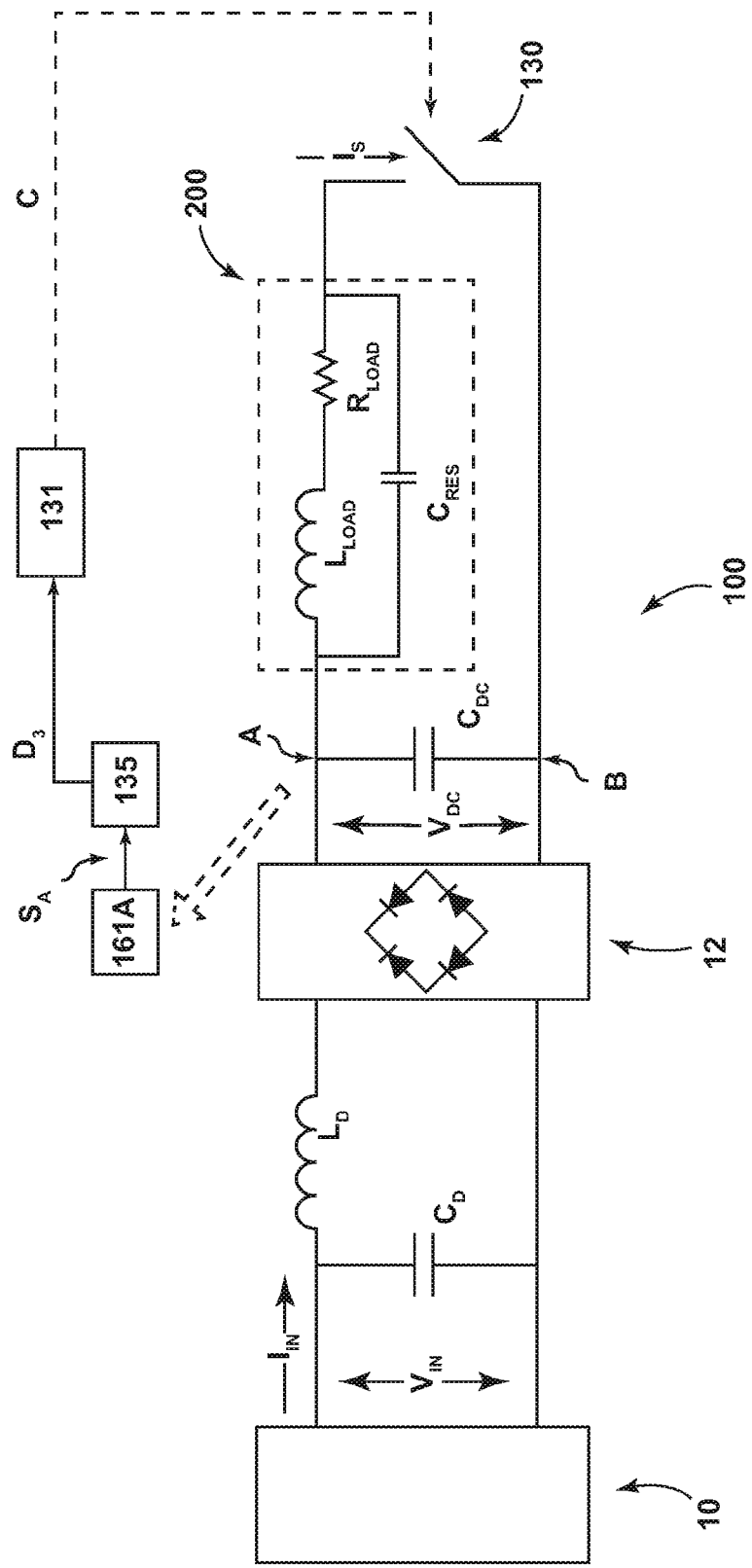
FIG. 2 shows a schematic diagram of a further embodiment of the power supply device, according to the disclosure.
Figure 3:
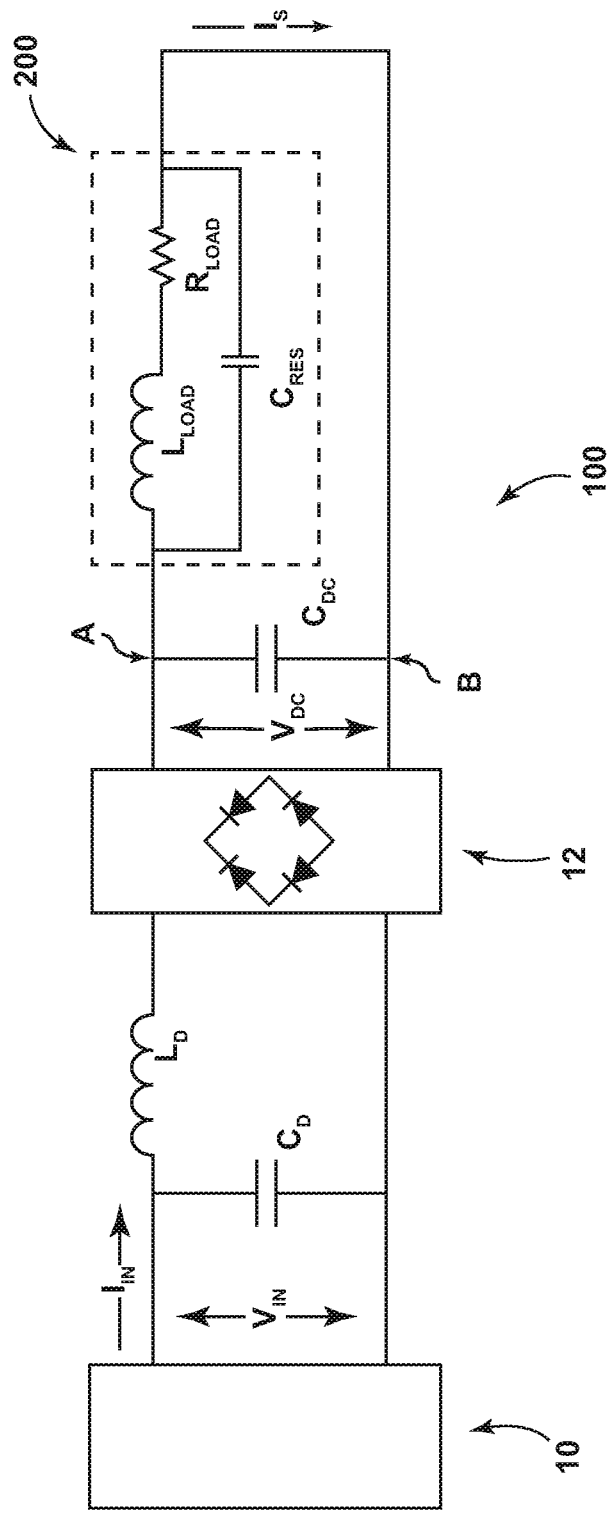
FIG. 3-4 shows the power supply device of FIG. 1 in different operative conditions.

In a first switching period $T_{ON}$, the switching device 130 is conductive and it allows the flow of a first current $I_S$ between the bus capacitor $C_{DC}$ and the resonant tank 200 (FIG. 3).

In a second switching period $T_{OFF}$, the switching device 130 is open and one of the terminals of the resonant tank 200 is floating.

In this case, the switching device 130 blocks the flow of the current $I_S$ between the bus capacitor $C_{DC}$ and the resonant tank 200.

The exchange of energy between the bus capacitor $C_{DC}$ and the resonant tank 200 is thus alternatively allowed/blocked by the switching device 130.

Figure 6:
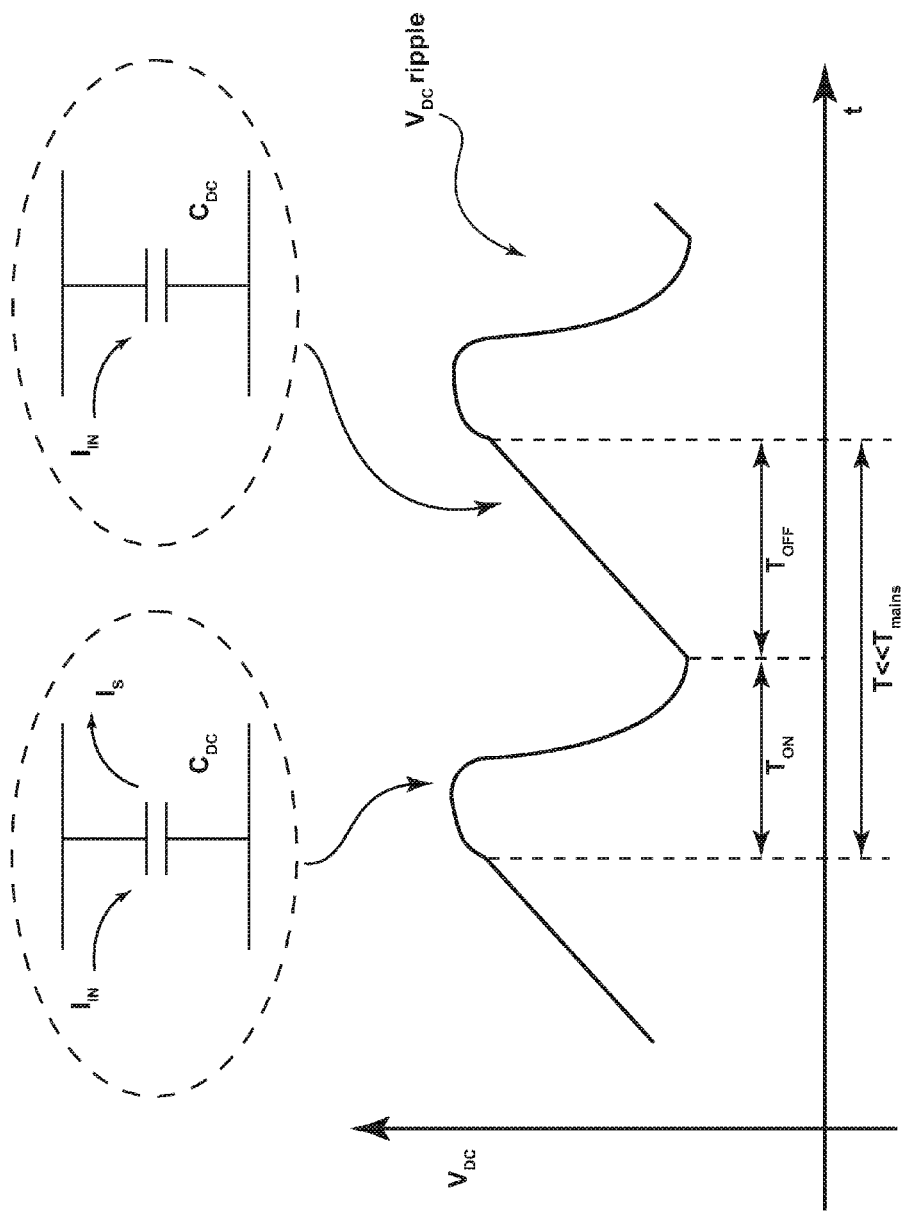

Because of the relatively small capacitance value of the capacitor $C_{DC}$, the bus voltage $V_{DC}$ shows a ripple ($V_{DC}$ ripple) that has a frequency (calculated as 1/T) equal to the switching frequency of the switching device 130 (FIGS. 5-6).

In FIG. 6, it is evidenced the behaviour of such a $V_{DC}$ ripple during a switching cycle T of the switching device 130.

Advantageously, the power supply device 100 comprises a control loop for controlling the operation of the switching device 130 through properly generated control signals C.

Such a control loop comprises a controller 131 (of digital or analogue type) that generates control signals C for controlling the operation of the switching device 130.

The controller 131 comprises a microprocessor or another digital processing device.

According to the disclosure, the power supply device 100 comprises determining main power input that are configured to obtain estimation data $D_3$ indicative of the input current $I_{IN}$ adsorbed from the main power input by the power supply device 100.

Estimation data $D_3$ are obtained on the base of the rate of change of the bus voltage $V_{DC}$.

Said determining means comprise detecting means 161, 161A, 162 that are configured to provide detection signals or data $D_1$, $D_2$, $S_A$ indicative of behaviour of the bus voltage $V_{DC}$.

Said determining means comprise also processing means 132, 135 operatively associated with said detecting means and configured to obtain the estimation data $D_3$ on the base of the detection signals or data provided by said detecting means.

The estimation data $D_3$ can be advantageously used by the controller 131 in accordance to the needs.

The controller 131 may use the estimation data $D_3$ for calculating error data that are indicative of a difference between the input current $I_{IN}$ (or power) that is actually adsorbed by the power supply device 100 and a reference current (or power).

Error data $D_4$ may be then used by the controller 131 to adjust the control quantity (frequency or duty-cycle) that is adopted to control the operation of the switching device 130 by generating proper command signals C.

Furthermore, the estimation data $D_3$ might be used for Over Current Protection purposes.

In this case, the controller 131 may comprise comparing means (not shown) for comparing the estimation data $D_3$ with a threshold value and generating a signal for deactivating the switching converter, if said threshold value is overcome.

The mentioned determining means 161, 161A, 162, 131, 132, 135 exploit the natural fluctuations ($V_{DC}$ ripple) of the bus voltage $V_{DC}$ at the terminals of the bus capacitor $C_{DC}$ to estimate the input current $I_{IN}$ that is actually adsorbed from the main power input.

To this aim, the determining means may use values of the voltage $V_{DC}$ taken at different instants $t_1$, $t_2$ of the second switching period $T_{OFF}$.

Figure 4:
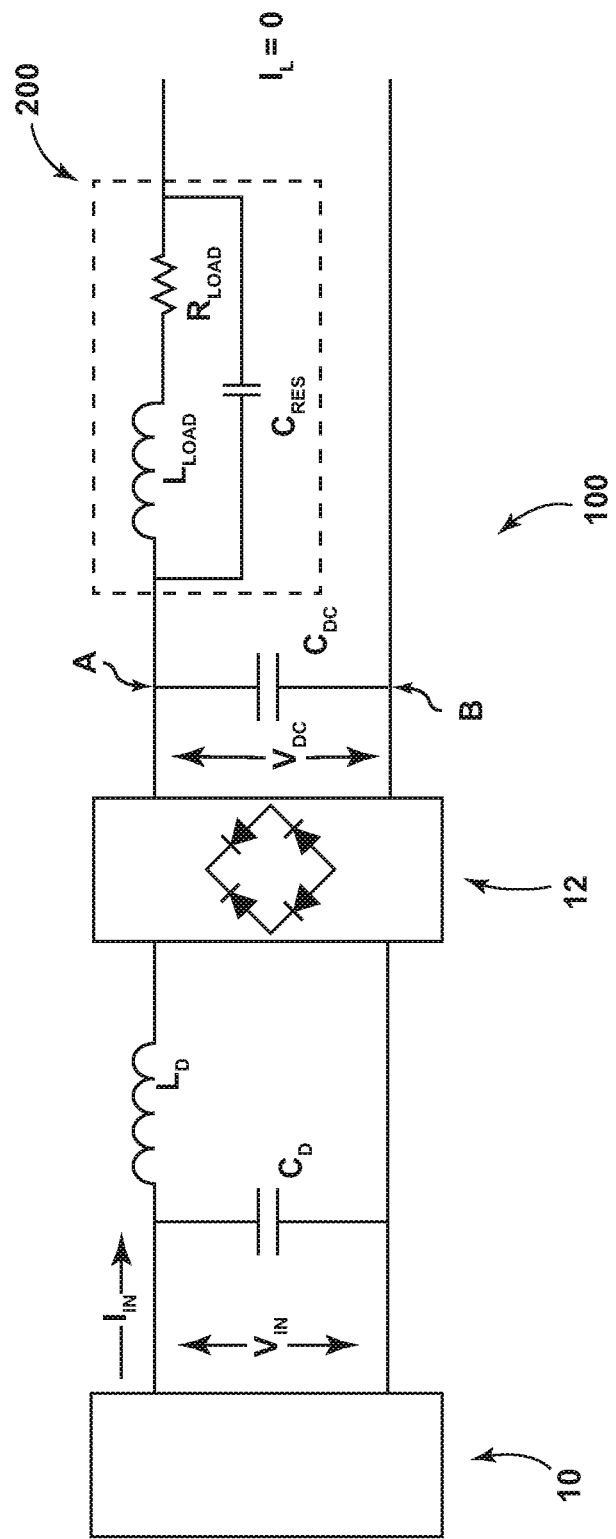

As mentioned above, during the second switching period $T_{OFF}$, the switching device 130 blocks any exchange of energy between the bus capacitor $C_{DC}$ and the resonant tank 200 (FIG. 4).

Due to resonating phenomena, the energy is exchanged within the resonant tank, basically between the resonant capacitor $C_{RES}$ and the inductive-resistive load (resonating phase).

In this phase, the bus capacitor $C_{DC}$ is charged by the input current $I_{IN}$ adsorbed by the main power input and the bus voltage $V_{DC}$ increases with a substantially linear trend.

The input current $I_{IN}$, in fact, varies in a relatively slow manner over time, due to the presence of the filtering inductor $L_D$.

Thus, during the resonating phase (switching period $T_{OFF}$), the input current $I_{IN}$ can be considered as an almost constant current that charges the bus capacitor $C_{DC}$.

During the first switching period $T_{ON}$, the switching device 130 allows the bus capacitor $C_{DC}$ to exchange electric energy with the resonant tank 200 (FIG. 3), since the bus capacitor $C_{DC}$ is connected in parallel with it.

In this situation, the bus voltage $V_{DC}$ may show an initial increase since the bus capacitor $C_{DC}$ adsorbs a (negative) current $I_S$ from the resonant tank 200.

However, from a certain instant onwards the bus voltage $V_{DC}$ starts decreasing because the resonant 200 drains a (positive) current $I_S$ from the bus capacitor $C_{DC}$.

Meanwhile, the bus capacitor $C_{DC}$ is continuously charged by the input current $I_{IN}$ that is lower than the load current $I_S$ drawn from it.

In this case, in fact, the input current $I_{IN}$ can still be considered as an almost constant current that charges the capacitor $C_{DC}$ while the load current $I_S$ can be considered as a variable current discharging the capacitor $C_{DC}$ (see FIG. 6).

In the switching period $T_{ON}$, the bus voltage $V_{DC}$ decreases with a substantially non-linear trend.

However, on the base of the considerations above, it can be reasonably assumed that the input current $I_{IN}$ is substantially kept at a constant level during a whole switching cycle T of the switching device 130.

In order to estimate the value of the input current $I_{IN}$, it is thus convenient to acquire the rate of change of the bus voltage $V_{DC}$ during the switching cycle $T_{OFF}$, in which the voltage $V_{DC}$ is not subject to non-linear transients as it happens during the switching cycle $T_{ON}$.

Once the rate of change of the bus voltage $V_{DC}$ is known, the estimation data $D_3$ indicative of the input current $I_{IN}$ adsorbed from the main power input, during a switching cycle T, can be easily calculated taking into consideration the general equations that describe the electrical behaviour of a capacitor.

In the present disclosure, the rate of change of the bus voltage VDC and the estimation data D3 are calculated in a digital manner.

According to the mentioned detecting means comprise a voltage sensor 161 that is operatively associated with sampling means 162 for providing digital samples $D_1$, $D_2$ of the bus voltage $V_{DC}$, at a first and second instant $t_1$, $t_2$ that are comprised in the second switching period $T_{OFF}$.

The voltage sensor 161 advantageously outputs a measuring signal of the bus voltage $V_{DC}$, which is then sampled by the sampling means 162 at the instants $t_1$, $t_2$.

The mentioned processing means comprise digital processing means 132 for obtaining the estimation data $D_3$ by interpolating the first and second digital samples $D_1$, $D_2$ over time.

Advantageously, the digital processing means 132 are stored in the controller 131 and implemented by one or more sets of software instructions that can be executed by the microprocessor of the controller 131.

An alternative embodiment of the present disclosure may foresee that the rate of change of the bus voltage $V_{DC}$ is determined in an analogue manner.

In this case, the detecting means advantageously comprise a voltage sensor 161A for providing analogue detection signals $S_A$ indicative of the behaviour of the bus voltage $V_{DC}$ while the processing means comprises an analogue processing circuit 135 that receives the detection signal $S_A$ from the voltage sensor 161A.

The processing circuit 135 is advantageously activated during the second switching period $T_{OFF}$ for obtaining the rate of change of the bus voltage $V_{DC}$ (estimation data $D_3$) on the base of the analogue detection signals $S_A$.

Figure 7A:
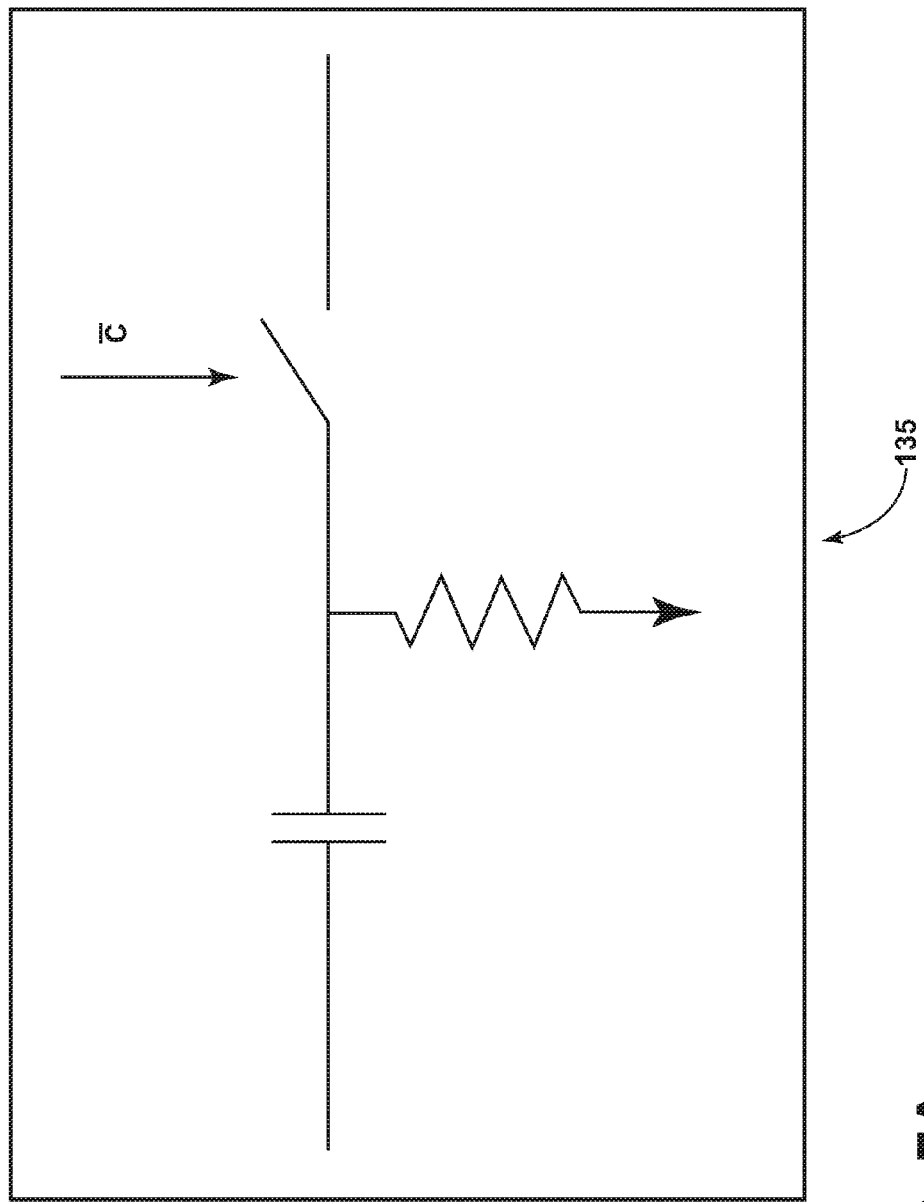
FIG. 7A, 7B show some examples of processing circuits in the power supply device of FIG. 2.
Figure 7B:
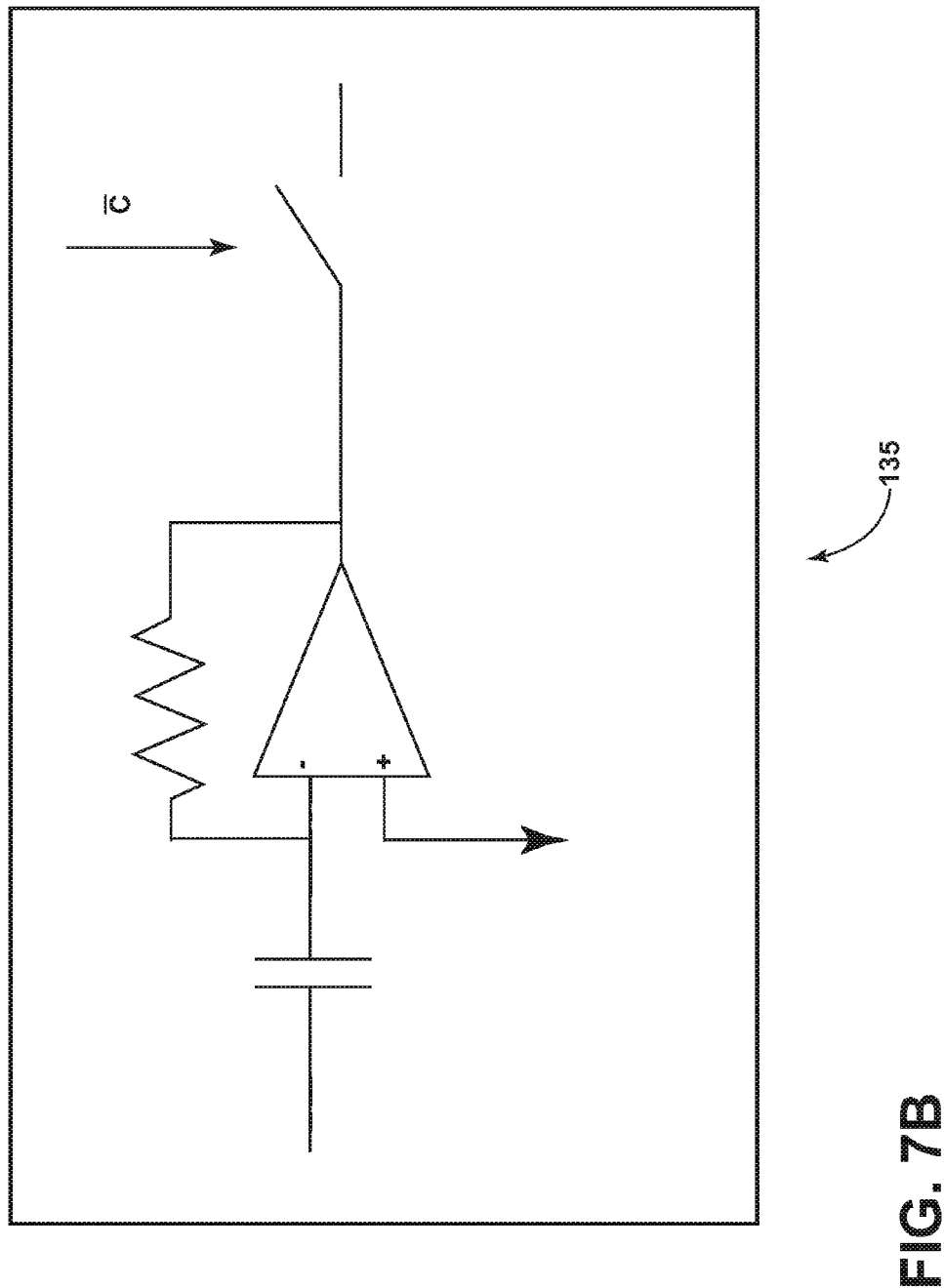

As an example, the processing circuit 135 may advantageously comprise an operational stage that is configured to receive the bus voltage $V_{DC}$ and is connected in series with a properly arranged R-C network for providing an output signal ($D_3$) indicative of the rate of change of the bus voltage $V_{DC}$ (FIGS. 7A, 7B). Other analogue circuit structures implementing the determination of the rate of change may obviously be effectively adopted.

The output signal $D_3$ provided by the analogue circuit 135 is advantageously sent to the control unit 131, which comprises a sample & hold circuit (not shown) for acquiring the he rate of change of the bus voltage $V_{DC}$ only during the switching period $T_{OFF}$.

In a further aspect, the present disclosure relates to a method for operating the power supply device 100.

The method according to the disclosure comprises the step of obtaining the estimation data $D_3$, indicative of the input current $I_{IN}$ that is adsorbed from the main power input 10 by the power supply device 100, on the base of the rate of change of the bus voltage $V_{DC}$ during the second switching period $T_{OFF}$.

The method, according to the disclosure, comprises the step of providing detection signals or data $D_1$, $D_2$, $S_A$, indicative of behaviour of the bus voltage $V_{DC}$, and the step of obtaining the estimation data $D_3$ on the base of said detection signals or data.

In an embodiment, the method, according to the disclosure, comprises the step of providing digital samples $D_1$, $D_2$ of the bus voltage $V_{DC}$, at a first and second instant $t_1$, $t_2$ comprised in the second switching period $T_{OFF}$, and the step of obtaining the estimation data $D_3$ by interpolating said first and second digital samples $D_1$, $D_2$ over time and dividing the angular coefficient of said interpolation by the value of the bus capacitor $C_{DC}$.

In another embodiment the estimation data $D_3$ is obtained by dividing the difference between $D_2$ and $D_1$ by the product of the capacitance value of $C_{DC}$ and the time distance between $t_2$ and $t_1$.

Alternatively, the method, according to the disclosure, may comprise the step of providing analogue detection signals $S_A$, indicative of behaviour of said bus voltage $V_{DC}$, and the step of obtaining said estimation data $D_3$ on the base of said analogue detection signals $S_A$.

In particular, said estimation $D_3$ are obtained by derivation vs. time of the detection signals $S_A$ and division by the capacitance value of $C_{DC}$.

From the above, it is apparent how the mentioned determining means are part of the control loop for controlling the operation of the switching device 130.

Yet a further aspect of the present disclosure thus relates to a control loop for a switching converter of a power supply device 100 that comprises the mentioned determining means 161, 161A, 162, 131, 132, 135.

The power supply device 100 and the operating method thereof, according to the present disclosure, fully allow the achievement of the intended aims and objects.

The power supply device 100, and the operating method thereof, allows the acquiring of estimation data $D_3$, indicative of the input current $I_{IN}$ adsorbed from the main power input, without performing current measurements on the circuitry electrically connected to the main power input.

The estimation data $D_3$ are obtained on the base of that the rate of change of the bus voltage $V_{DC}$ in the switching period $T_{OFF}$.

Such a rate of change can be easily obtained by means of voltage measurements at the terminals of the bus capacitor $C_{DC}$.

An estimation of the input current $I_{IN}$ can thus be obtained without the adoption of a dedicated current sensor, thereby without additionally complicating the hardware structure of the power supply device 100.

The power supply device, and the operating method thereof, according to the disclosure, has a therefore simplified circuit structure with respect to the devices of the state of the art and it is relatively easy and relatively cheap to manufacture at industrial level.

The invention claimed is:

1. A household appliance power supply device, comprising:
   a switching converter; and
   a determining device, wherein, the switching converter comprises:
   an input filtering stage, comprising at least one of a filtering inductor, and a rectifying stage, electrically connected with a main power supply, wherein the rectifying stage includes at least one rectifying stage output terminal;

a bus capacitor, electrically connected with the at least one rectifying stage output terminal;

a resonant tank electrically connected with at least one bus capacitor terminal; and a switching device configured for operation with a switching cycle, the switching device is electrically connected with said resonant tank, wherein the switching cycle comprises a first switching period, in which said switching device allows a flow of a first current between said bus capacitor and said resonant tank, and a second switching period, in which said switching device blocks the flow of said first current; and wherein the determining device is configured to obtain estimation data indicative of an input current that is adsorbed from the main power supply by said power supply device, said estimation determined based on the rate of change of a bus voltage across the at least one bus capacitor terminals during said second switching period.

2. The household appliance power supply device, according to claim 1, wherein said determining device comprise detecting means, configured to provide detection signals or data, indicative of said bus voltage, and processing means, operatively associated with said detecting means and configured to obtain said estimation data based on at least one of said detection signals and a detection data.

3. The household appliance power supply device, according to claim 2, wherein said detecting means comprise a first voltage sensor operatively associated with sampling means for providing digital samples of said bus voltage, at a first and second instant comprised in said second switching period, said processing means comprising digital processing means for obtaining said estimation data by interpolating said first and second digital samples over time.

4. The household appliance power supply device, according to claim 2, wherein said detecting means comprise a second voltage sensor for providing analogue detection signals of said bus voltage, said processing means comprising an analogue processing circuit that is activated during said second switching period for obtaining said estimation data based on said analogue detection signals.

5. The household appliance power supply device, according to claim 1, wherein said switching converter is a Q-R switching converter.

6. The household appliance power supply device, according to claim 1, further comprising, a household appliance configured to receive the power supply device, said household appliance is at least one of a microwave oven and an induction cook-top.

7. The household appliance power supply device, according to claim 1, wherein said determining device is part of a control loop for adjusting a power or an electric current supplied by said power supply device.

8. The household appliance power supply device according to claim 1, wherein the bus capacitor is electrically connected in parallel with the at least one rectifying stage output terminal.

9. The household appliance power supply device according to claim 1, wherein the switching device is electrically connected in series with said resonant tank.

10. A method for operating a household appliance power supply device, comprising:

configuring a household appliance power supply device with a switching converter, wherein the switching converter includes an input filtering stage configured with at least one filtering inductor, and a rectifying stage;

connecting a main power input, electrically, to the rectifying stage;

connecting a bus capacitor, electrically, to at least one output terminal configured at least one of on an outside surface or within said rectifying stage;

connecting a resonant tank, electrically, to at least one terminal configured at least one of on an outside surface or within said bus capacitor;

connecting a switching device, electrically, to said resonant tank;

operating said switching device with a switching cycle, wherein the switching cycle comprises a first switching period, and a second switching period;

configuring the first switching period to allow a flow of a first current between said bus capacitor and said resonant tank;

configuring the second switching period to block the flow of said first current; and obtaining an estimation data obtained based on the rate of change of a bus voltage across a rectifying stage terminal on the rectifying stage and the at least one terminal configured on the outside surface or within the bus capacitor during said second switching period, wherein the estimation data is indicative of an input current that is adsorbed from the main power input by said household appliance power supply device.

11. The method, according to claim 10, further comprising: providing at least one of a detection signal and a signal data indicative of said bus voltage.

12. The method, according to claim 10, further comprising:

providing a digital sample of said bus voltage, at a first instant in time and a second instant in time of the second switching period; and obtaining said estimation data by differentiating said first and second digital samples over a predetermined time.

13. The method, according to claim 10, further comprising: providing an analogue detection signal of said bus voltage; and obtaining said estimation data on a basis of said analogue detection signal.

14. The method, according to claim 10, wherein said switching converter is a Q-R switching converter.

15. The method, according to claim 10, further comprising, a household appliance configured to receive the power supply device, said household appliance is at least one of a microwave oven and an induction cook-top.

16. A household appliance power supply device, comprising:

a switching converter; and a determining device, wherein, the switching converter includes an input filtering stage electrically connected with a main power supply, a bus capacitor, a resonant tank electrically connected with at least one bus capacitor terminal; and a switching device configured for operation with a switching cycle, the switching device is electrically connected with said resonant tank, wherein the switching cycle comprises a first switching period, in which said switching device allows a flow of a first current between said bus capacitor and said resonant tank, and a second switching period, in which said switching device blocks the flow of said first current; and wherein the determining device is configured to obtain estimation data indicative of an input current that is adsorbed from the main power supply by said power supply device, based on the rate of change of a bus voltage measured across the at least one bus capacitor terminal during said second switching period.

17. The power supply device, according to claim 16, wherein the input filtering stage includes at least one of a filtering inductor, and a rectifying stage, the input filtering stage is electrically connected with the main power supply, wherein the rectifying stage includes at least one rectifying stage output terminal.

18. The power supply device, according to claim 17, wherein the bus capacitor is electrically connected in parallel with the at least one rectifying stage output terminal.

19. The power supply device, according to claim 17, wherein the resonant tank electrically connected with at least one bus capacitor terminal.

20. The power supply device, according to claim 17, wherein the bus capacitor is electrically connected in parallel with the at least one rectifying stage output terminal and the switching device is electrically connected in series with said resonant tank.

* * * * *